US008980788B2

(12) United States Patent
Minoda et al.

(10) Patent No.: US 8,980,788 B2
(45) Date of Patent: Mar. 17, 2015

(54) HYDROGEN STORAGE MATERIAL

(75) Inventors: Ai Minoda, Tokyo (JP); Shinji Oshima, Tokyo (JP); Daisuke Watanabe, Tokyo (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 292 days.

(21) Appl. No.: 13/501,538

(22) PCT Filed: Sep. 14, 2010

(86) PCT No.: PCT/JP2010/065852
§ 371 (c)(1),
(2), (4) Date: May 8, 2012

(87) PCT Pub. No.: WO2011/046001
PCT Pub. Date: Apr. 21, 2011

(65) Prior Publication Data
US 2012/0215013 A1 Aug. 23, 2012

(30) Foreign Application Priority Data

Oct. 15, 2009 (JP) ................... P 2009-238396

(51) Int. Cl.
*C01B 31/12* (2006.01)
*C01B 31/08* (2006.01)
*B82Y 30/00* (2011.01)
*C01B 3/00* (2006.01)

(52) U.S. Cl.
CPC .............. *C01B 31/08* (2013.01); *B82Y 30/00* (2013.01); *C01B 3/0021* (2013.01); *C01B 3/0026* (2013.01); *Y02E 60/325* (2013.01); *Y02E 60/327* (2013.01)
USPC ........................ 502/417; 502/416; 502/427

(58) Field of Classification Search
USPC .......................... 502/416, 417, 427
See application file for complete search history.

(56) References Cited

U.S. PATENT DOCUMENTS

| 4,082,694 | A | | 4/1978 | Wennerberg et al. | |
| 4,831,011 | A | * | 5/1989 | Oikawa et al. | 502/406 |
| 7,968,191 | B2 | * | 6/2011 | Hampden-Smith et al. | 428/408 |

FOREIGN PATENT DOCUMENTS

| JP | 62-61529 | | 12/1987 |
| JP | H0834605 | | 2/1996 |
| JP | 2002-28483 | A | 1/2002 |
| JP | 2005-129722 | | 5/2005 |
| JP | 2007-529404 | A | 10/2007 |
| JP | 2007-320799 | | 12/2007 |
| JP | 2009-292670 | A | 12/2009 |

OTHER PUBLICATIONS

Chambers et al., "Hydrogen Storage in Graphite Nanofibers", Journal of Physical Chemistry B, vol. 102, No. 22, May 28, 1998, pp. 4253-4256.
Kobayashi, "Introductive Scenario for Hydrogen fuel battery of Automobile", Journal of the Japan Institute of Energy, vol. 25, No. 4, 2003, pp. 73-87, with partial English language translation thereof.
Kuriyama, "The Trend of Hydrogen Storage Technology", Energy Resources, vol. 24, No. 6, 2003, pp. 23-27, with partial English language translation thereof.
Akiyama et al., "High Pressure Container-Hydrogen Storage Technology", Engine Technology, vol. 5, No. 3, Jun. 2003, pp. 43-47.
Akiba, "Hydrogen Storage by Hydrogen Storage Materials", Engine Technology, vol. 5, No. 3, Jun. 2003, pp. 36-42.
Ma et al., "Hydrogen Uptake in Boron Nitride Nanotubes at Room Temperature", Journal of the American Chemical Society, vol. 124, No. 26, Jun. 11, 2002, pp. 7672-7673.
Rosi et al., "Hydrogen Storage in Microporous Metal-Organic Frameworks", Science, vol. 300, May 16, 2003, pp. 1127-1129.
Minoda et al., "Suiso Shakai ni Muketa Suiso Kyuzo Zaizyo no Kaihatsu", The Chemical Society of Japan Koen Yokoshu, vol. 90, No. 1, Mar. 12, 2010 (As indicated in International Search Report for PCT/JP2010/065852), p. 55.
English language International Search Report for PCT/JP2010/065852, mailed Nov. 9, 2010.
English language translation of International Preliminary Report on Patentability for PCT/JP2010/065852, mailed May 24, 2012.
Japanese Office Action for JP Application No. 2009-238396, which is dated Aug. 5, 2014.
English language translation of paragraphs [0013] and [0019] of JP 2002-28483, Jan. 29, 2002.
Notice of Allowance issued in JP Patent Application No. 2009-238396 mailed Oct. 28, 2014.

* cited by examiner

*Primary Examiner* — Stuart Hendrickson
(74) *Attorney, Agent, or Firm* — Greenblum & Bernstein, P.L.C.

(57) ABSTRACT

The invention provides a hydrogen storage material comprising a porous carbon material having oxygen-containing functional groups on the surface, and Li bonded to the surface of the porous carbon material. The hydrogen storage material of the invention has more excellent hydrogen storage capacity than the prior art.

3 Claims, 4 Drawing Sheets

HYDROGEN STORAGE MATERIAL

TECHNICAL FIELD

The present invention relates to a hydrogen storage material.

BACKGROUND ART

Hydrogen is widely used in many industrial fields including petroleum refining and chemical engineering, but especially in recent years it has become noted as a future energy source, and research is being conducted with particular emphasis on fuel cells. However, hydrogen gas has high volume per quantity of heat, as well as high energy requirement for liquefaction, which poses the problem that its storage and transport in that form have been difficult (see Non-patent document 1, for example). Techniques are therefore being sought for efficient transport and storage of hydrogen, when fuel cells are to be used in vehicles such as fuel cell automobiles or as distributed power sources.

One method that has been proposed is to use hydrogen in the form of liquid hydrogen for storage and transport, but since the liquefaction temperature is a cryogenic temperature of −253° C. it is difficult to handle, and massive energy is required for liquefaction, thus lowering the overall energy efficiency (see Non-patent document 2, for example).

Methods of using hydrogen as a high-pressure gas for transport are also being implemented. Such methods, however, entail problems such as requiring the handling of dangerous high-pressure gas, with a very large the volume even at the extremely high pressure of 35 MPa, making it difficult to achieve small sizes (see Non-patent document 3, for example).

One powerfully effective method is storage in hydrogen storage alloys. However, the hydrogen storage capacity of hydrogen storage alloys is usually about 3%, which is not only insufficient for use in vehicles and the like, but also results in excessively increased weight. Hydrogen storage alloys also have reduced energy efficiency because of the need for large amounts of heat during hydrogen desorption, while the system also becomes complicated (see Non-patent document 4, for example).

The use of hydrogen storage materials is also considered as a means of transporting hydrogen gas in a compact manner (see Patent document 1). Because this method allows hydrogen desorption to be accomplished at ordinary temperature and thus simplifies the system, while it generally does not require heat for hydrogen desorption and thus has high energy efficiency, the development of such materials is being actively pursued. It has also been reported that materials such as carbon nanotubes and carbon nanofibers exhibit high storage capacity (see Non-patent document 5, for example). However, their reproducibility is in question, and at the current time it cannot be said that the development of hydrogen storage materials with sufficient reproducibility and high storage capacity has been achieved.

A demand therefore exists for development of materials with high storage capacity, and hence materials with fine pore sizes of the same level as hydrogen are being studied as materials with high storage capacity. Examples of such materials include the aforementioned carbon nanotubes and carbon nanofibers, but also other primarily carbon-based materials. Materials other than carbon have also been reported, including boron nitride nanotubes (Non-patent document 6) and porous complexes (Non-patent document 7). However, despite reports of some materials exhibiting high storage capacity, the currently available data is not sufficiently reliable.

CITATION LIST

Patent Literature

[Patent document 1] Japanese Patent Public Inspection No. 2007-529404

Non-Patent Literature

[Non-patent document 1] Kobayashi, "Journal of the Institute of Applied Energy, Japan", Vol. 25, No. 4, 2003, p. 73-87
[Non-patent document 2] Kuriyama, "Energy Resources", Vol. 24, No. 6, 2003, p. 23-27
[Non-patent Document 3] Akiyama et al., "Engine Technology", Vol. 5, No. 3, 2003, p. 43-47
[Non-patent Document 4] Akiba, "Engine Technology", Vol. 5, No. 3, 2003, pp. 36-42
[Non-patent Document 5] A. Chambers et al., "Journal of Physical Chemistry B (J. Phys. Chem. B)" (US) Vol. 102 1998, p. 4253-4256
[Non-patent Document 6] Renzhi Ma et al., "Journal of American Chemical Society (J. Am. Chem. Soc.)" (US), Vol. 124, 2002, p. 7672-7673
[Non-patent Document 7] Nathaniel L. Rosi et al., "Science" (UK), Vol. 300, 2003, p. 1127-1129

SUMMARY OF INVENTION

Technical Problem

With the increasing availability of hydrogen in recent years, further improvements are desired in the hydrogen storage capacity of hydrogen storage materials. One method of increasing hydrogen storage capacity is to increase the specific surface area of the hydrogen storage material, thereby increasing the amount of hydrogen that is physically adsorbed on the surface of the hydrogen storage material. However, simply increasing the amount of physical adsorption of hydrogen does not allow the desired hydrogen storage capacity to be easily achieved.

It is an object of the present invention, which has been accomplished in light of the aforementioned problems of the prior art, to provide a hydrogen storage material with more excellent hydrogen storage capacity than the prior art.

Solution to Problem

In order to achieve the object stated above, the hydrogen storage material of the invention comprises a porous carbon material having oxygen-containing functional groups on the surface, and Li bonded to the surface of the porous carbon material. For the purpose of the invention, the "surface of the porous carbon material" includes the inner walls of the pores of the porous carbon material.

Since the hydrogen storage material of the invention comprises Li which has high affinity with hydrogen, it has more excellent hydrogen storage capacity compared to conventional hydrogen storage materials composed of carbon materials.

According to the invention, the oxygen-containing functional groups are preferably of at least one type selected from the group consisting of a phenolic hydroxyl group, a quinone group, a carboxyl group and a lactonic carboxyl groups group. This facilitates bonding of Li to the surface of the porous carbon material, so that the effect of the invention can be more notably exhibited.

According to the invention, the porous carbon material is preferably activated coke. This will allow the effect of the invention to be exhibited more notably.

Advantageous Effects of Invention

According to the invention it is possible to provide a hydrogen storage material with more excellent hydrogen storage capacity than the prior art.

DESCRIPTION OF EMBODIMENTS (Hydrogen Storage Material)

Figure 1:
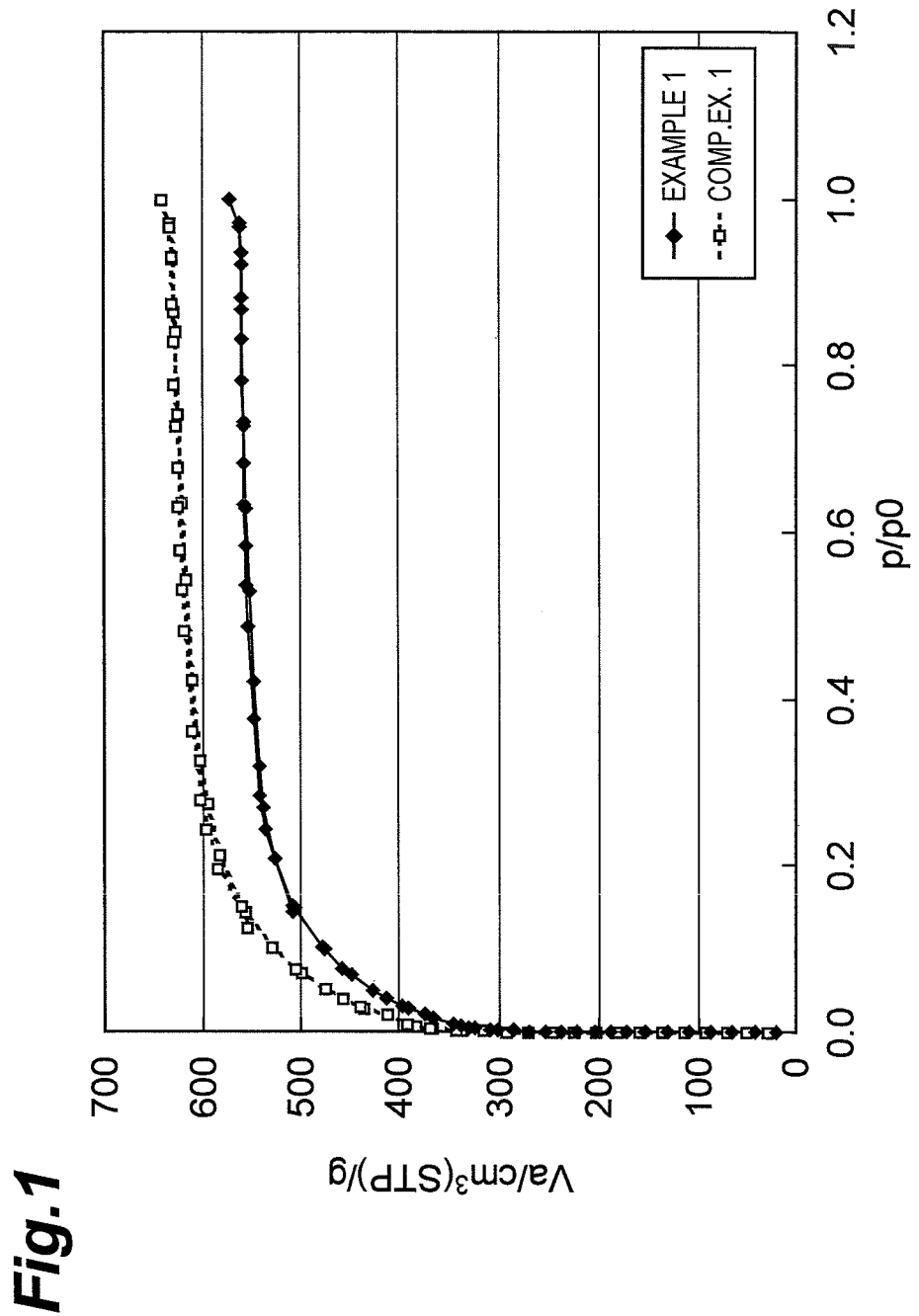
FIG. 1 is a nitrogen adsorption isotherm for the hydrogen storage materials of Example 1 of the invention and Comparative Example 1.

Preferred embodiments of the invention will now be described in detail. The hydrogen storage material of this embodiment comprises a porous carbon material. Oxygen-containing functional groups are formed on the surface of the porous carbon material, and Li is bonded thereto. Most preferably, oxygen-containing functional groups are formed on the inner wall surfaces of the micropores of the porous carbon material, and Li bonds to the inner wall surfaces of the micropores of the porous carbon material. This notably increases the hydrogen storage capacity.

The porous carbon material is preferably activated coke, and more preferably it is coke from which K has been removed, after activation by heating with KOH. The coke used may be petroleum coke or coal-derived coke. Other types of common active carbon may also be used as the porous carbon material.

The oxygen-containing functional groups are preferably of at least one type selected from the group consisting of a phenolic hydroxyl group, a quinone group, a lactonic carboxyl group and a carboxyl group.

Chemical Formula (1) below shows an example of a portion of the surface of the porous carbon material and the structure of a phenolic hydroxyl group formed on the surface.

[Chemical Formula 1]

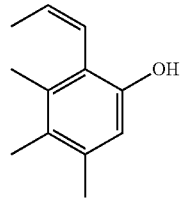

(1)

Chemical Formula (2) below shows an example of a portion of the surface of the porous carbon material and the structure of a quinone group formed on the surface.

[Chemical Formula 2]

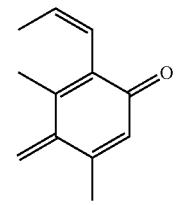

(2)

Chemical Formula (3) below shows an example of a portion of the surface of the porous carbon material and the structure of a lactonic carboxyl group formed on the surface.

[Chemical Formula 3]

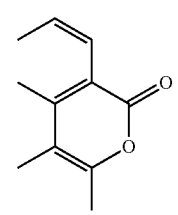

(3)

Chemical Formula (4) below shows an example of a portion of the surface of the porous carbon material and the structure of a carboxyl group formed on the surface.

[Chemical Formula 4]

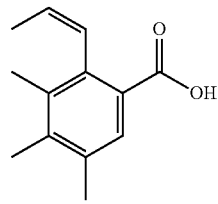

(4)

Chemical Formula (5) below shows a state in which Li is not bonded to part of the surface of the porous carbon material wherein carboxyl groups and hydroxyl groups are formed as oxygen-containing functional groups. Chemical Formula (6)

below shows a state in which Li is bonded to part of the surface of the porous carbon material shown in Chemical Formula (5).

[Chemical Formula 5]

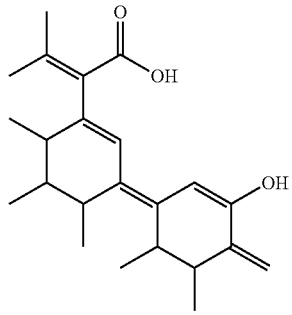

(5)

[Chemical Formula 6]

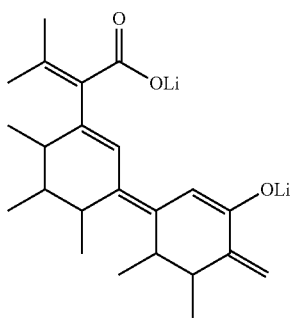

(6)

As shown in Chemical Formulas (5) and (6), Li is preferably bonded to oxygen in the oxygen-containing functional groups, forming LiO groups. The LiO groups have a property of powerfully adsorbing hydrogen molecules. Thus, formation of LiO groups on the surface of the porous carbon material increases the adsorption density of hydrogen molecules in the hydrogen storage material, notably improving hydrogen storage capacity over the prior art.

The oxygen-containing functional groups are most preferably phenolic hydroxyl groups, among the functional groups mentioned above. For increased hydrogen storage capacity, Li bonded to phenolic hydroxyl groups is preferred over Li bonded to other oxygen-containing functional groups.

The specific surface area of the hydrogen storage material is preferably 500 m$^2$/g or greater, and more preferably 1000 m$^2$/g or greater. A hydrogen storage material with a high specific surface area of the hydrogen storage material may have a value of, for example, about 4000 m$^2$/g. However, the specific surface area of the hydrogen storage material is not limited to these values. Since a larger specific surface area is associated with increased hydrogen storage capacity, a larger specific surface area is preferred. The specific surface area of the hydrogen storage material may be evaluated by the BET method.

The amount of Li in the hydrogen storage material may be about 0.1-3 mmol/g. However, the amount of Li in the hydrogen storage material is not limited to this range. A larger amount of Li introduced into the hydrogen storage material increases the hydrogen storage capacity, and therefore a larger amount of Li introduction is preferred.

(Method for Producing Hydrogen Storage Material)

A method for producing a hydrogen storage material using KOH-activated coke as the porous carbon material will now be below described.

First, the coke is activated to form a porous carbon material. For this embodiment, preferably a mixture of coke and KOH is heat-treated. This forms oxygen-containing functional groups on the surface of the coke. Next, the heated coke is stirred with water, and this is repeatedly alternated with filtration for rinsing of the coke. After stirring the rinsed coke with hydrochloric acid, the stirring of coke and water is again repeatedly alternated with filtration for rinsing of the coke. This series of steps inactivates and removes the potassium remaining on the surface of the coke that has been heated with KOH. Porous coke activated by oxygen-containing functional groups is thus obtained. For this embodiment, the coke is preferably not calcined again after the oxygen-containing functional groups have been formed on the surface by heating with KOH. If the coke is calcined after the oxygen-containing functional groups have been formed on the surface, the oxygen dissociates from the oxygen-containing functional groups, tending to result in loss of oxygen-containing functional groups.

By reacting activated coke with a Li reagent, Li is introduced into the coke, obtaining a hydrogen storage material according to this embodiment. The Li reagent used may be a Li salt aqueous solution or an organic Li solution. The Li agent used may be a $Li_2CO_3$ aqueous solution, LiOH aqueous solution, n-butyllithium/hexane solution, methyllithium/diethyl ether solution or lithium diisopropylamide-THF/ethylbenzene/heptane solution, and a LiOH aqueous solution is preferably used. The activated coke is dispersed in the Li salt aqueous solution, and the mixture is stirred at between room temperature and 100° C. to introduce the Li into the coke. The concentration of the Li salt aqueous solution may be adjusted to about 0.1-1 M. The amount of Li in the Li salt aqueous solution is preferably 1-10 equivalents, and more preferably 4 equivalents, with respect to the oxygen-containing functional groups formed on the surface of the activated coke.

A preferred embodiment of the hydrogen storage material of the invention and a method for producing it was described in detail above, but the invention is not limited to this embodiment. For example, coke activated with water vapor, $CO_2$ or NaOH instead of KOH may be used as the porous carbon material. This will also allow the effect of the invention to be achieved, similar to the described embodiment.

EXAMPLES

The present invention will now be below explained in greater detail based on examples and comparative examples, with the understanding that the invention is in no way limited to the examples.

Comparative Example 1

After mixing KOH in an amount of 2 equivalents with respect to petroleum coke (based on mass), heat treatment was conducted for 1 hour in a nitrogen gas atmosphere at 750° C., to obtain the activated product.

A rinsing procedure was repeated twice, comprising a step of adding water at 100 equivalents with respect to the activated product (based on mass) and stirring for 1 hour, and a step of filtering the stirred activated product. Next, 0.1N hydrochloric acid was added at 100 equivalents with respect to the rinsed activated product (based on mass), and the mixture was stirred for 1 hour and filtered, after which the same rinsing procedure described above was carried out. This series of steps inactivated and removed the potassium remaining on the surface of the activated product, to obtain activated coke. This activated coke will hereunder also be referred to as "hydrogen storage material of Comparative Example 1".

The activated coke was dispersed in a sodium hydroxide aqueous solution, in a sodium hydrogencarbonate aqueous solution and in aqueous sodium carbonate, and reacted, and then the bases remaining on the coke surface were back titrated with hydrochloric acid. The back titration allowed determination of the types of oxygen-containing functional groups present on the surface of the activated coke. The oxygen-containing functional groups on the surface of the activated coke were confirmed to consist of a quinone group, a hydroxyl group, a lactonic carboxyl group and a carboxyl group. In addition, the proportion of each of the functional groups with respect to the total oxygen-containing functional groups was also determined by back titration. The proportions of a quinone group, a hydroxyl group, a lactonic carboxyl group and a carboxyl group were confirmed to be approximately 30 mol %, 45 mol %, 20 mol % and 5 mol %, respectively.

Figure 2:
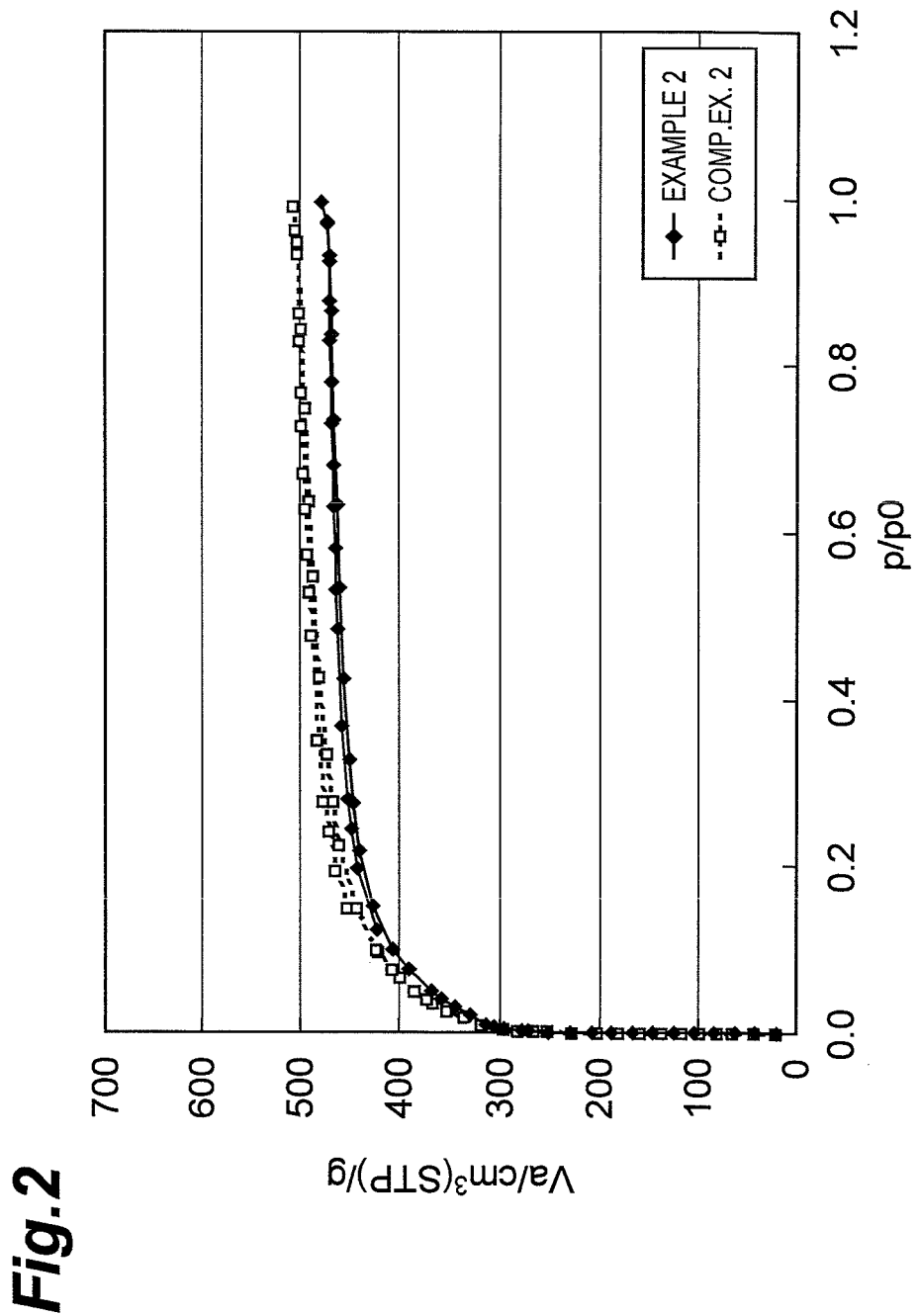
FIG. 2 is a nitrogen adsorption isotherm for the hydrogen storage materials of Example 2 of the invention and Comparative Example 2.

The BET specific surface area, total pore volume and micropore volume of the hydrogen storage material of Comparative Example 1 were measured by the nitrogen adsorption method. The measurement results are shown in Table 1. FIG. 1 shows a nitrogen adsorption isotherm for Comparative Example 1. The ratio p/p0 on the abscissa of FIG. 1 is the ratio of the nitrogen gas partial pressure p and the nitrogen gas vapor pressure p0. The units Va/cm$^3$ (STP)/g on the ordinate of FIG. 1 are the volume of nitrogen gas adsorbed onto a 1 g unit mass of the hydrogen storage material, under standard conditions. The abscissa and ordinate of FIG. 2 are the same as in FIG. 1.

Example 1

Activated coke was formed by the same method as in Comparative Example 1. The coke was vacuum dried at 120° C. for 4 hours. A solution obtained by mixing the dried coke with 100 mg of LiOH and 30 mL of water was stirred for 4 hours for reaction between the coke and LiOH. Upon completion of the reaction, the solution was subjected to suction filtration to filter out the solid, and the solid was rinsed 5 times with purified water. The rinsed solid was vacuum dried at 100° C. for 4 hours to obtain a hydrogen storage material for Example 1.

The specific surface area, total pore volume and micropore volume of the hydrogen storage material of Example 1 were measured by the same method as Comparative Example 1. The measurement results are shown in Table 1. FIG. 1 also shows a nitrogen adsorption isotherm for Example 1.

TABLE 1

|  | BET specific surface area (m$^2$/g) | Total pore volume (cm$^3$/g) | Micropore volume (cm$^3$/g) |
| --- | --- | --- | --- |
| Comp. Ex. 1 | 2073 | 0.9808 | 0.9455 |
| Example 1 | 1863 | 0.8760 | 0.8500 |

Comparative Example 2

Activated coke was prepared as a hydrogen storage material for Comparative Example 2. As a result of back titration in the same manner as Comparative Example 1, it was confirmed that a quinone group, a hydroxyl group, a lactonic carboxyl group and a carboxyl group had been formed on the surface of the coke of Comparative Example 2.

The specific surface area, total pore volume and micropore volume of the hydrogen storage material of Comparative Example 2 were measured by the same method as Comparative Example 1. The measurement results are shown in Table 2. FIG. 2 shows a nitrogen adsorption isotherm for Comparative Example 2.

Example 2

Activated coke similar to Comparative Example 2 was vacuum dried at 120° C. for 4 hours. A solution obtained by mixing the dried coke with 100 mg of LiOH and 30 mL of water was stirred for 4 hours for reaction between the coke and LiOH. Upon completion of the reaction, the solution was subjected to suction filtration to filter out the solid, and the solid was rinsed 5 times with purified water. The rinsed solid was vacuum dried at 100° C. for 4 hours to obtain a hydrogen storage material for Example 2.

The specific surface area, total pore volume and micropore volume of the hydrogen storage material of Example 2 were measured by the same method as Comparative Example 1. The measurement results are shown in Table 2. FIG. 2 also shows a nitrogen adsorption isotherm for Example 2.

TABLE 2

|  | BET specific surface area (m$^2$/g) | Total pore volume (cm$^3$/g) | Micropore volume (cm$^3$/g) |
| --- | --- | --- | --- |
| Comp. Ex. 2 | 1659 | 0.7821 | 0.7414 |
| Example 2 | 1585 | 0.7344 | 0.6945 |

[Elemental Analysis]

The contents of the elements in the hydrogen storage material of Example 1 were determined by ICP emission analysis. The hydrogen storage materials of Example 2 and Comparative Examples 1 and 2 were also analyzed in the same manner as Example 1. The elemental analysis results are shown in Table 3. The analyzer used for analysis of K and Li was an ICPS-8100 by Shimadzu Corp. The analyzer used for analysis of C, H and N was a Vario EL III by Elementar. The analyzer used for analysis of O was an EA1110 by CE Instruments. The units for the content of each element shown in Table 3 are number of moles per gram of hydrogen storage material.

TABLE 3

|  |  | Element | | | | | |
| --- | --- | --- | --- | --- | --- | --- | --- |
|  |  | K | Li | C | H | N | O |
|  |  | Atomic mass | | | | | |
|  |  | 39.1 | 6.94 | 12.0 | 1.0 | 14.0 | 16.0 |
| Content (mmol/g) | Comp. Ex. 1 | 0.00 | 0.00 | 75.7 | 5.0 | 0 | 3.5 |
|  | Example 1 | 0.00 | 0.43 | 72.2 | 8.0 | 0 | — |
|  | Comp. Ex. 2 | 0.00 | 0.00 | 75.8 | 7.0 | 0 | 3.5 |
|  | Example 2 | 0.00 | 0.36 | 73.8 | 8.0 | 0 | — |

The oxygen content of the hydrogen storage material of Example 1 was approximately the same as in Comparative Example 1. Also, the oxygen content of the hydrogen storage material of Example 2 was approximately the same as in Comparative Example 2.

[Measurement of Hydrogen Storage Capacity]

Figure 3:
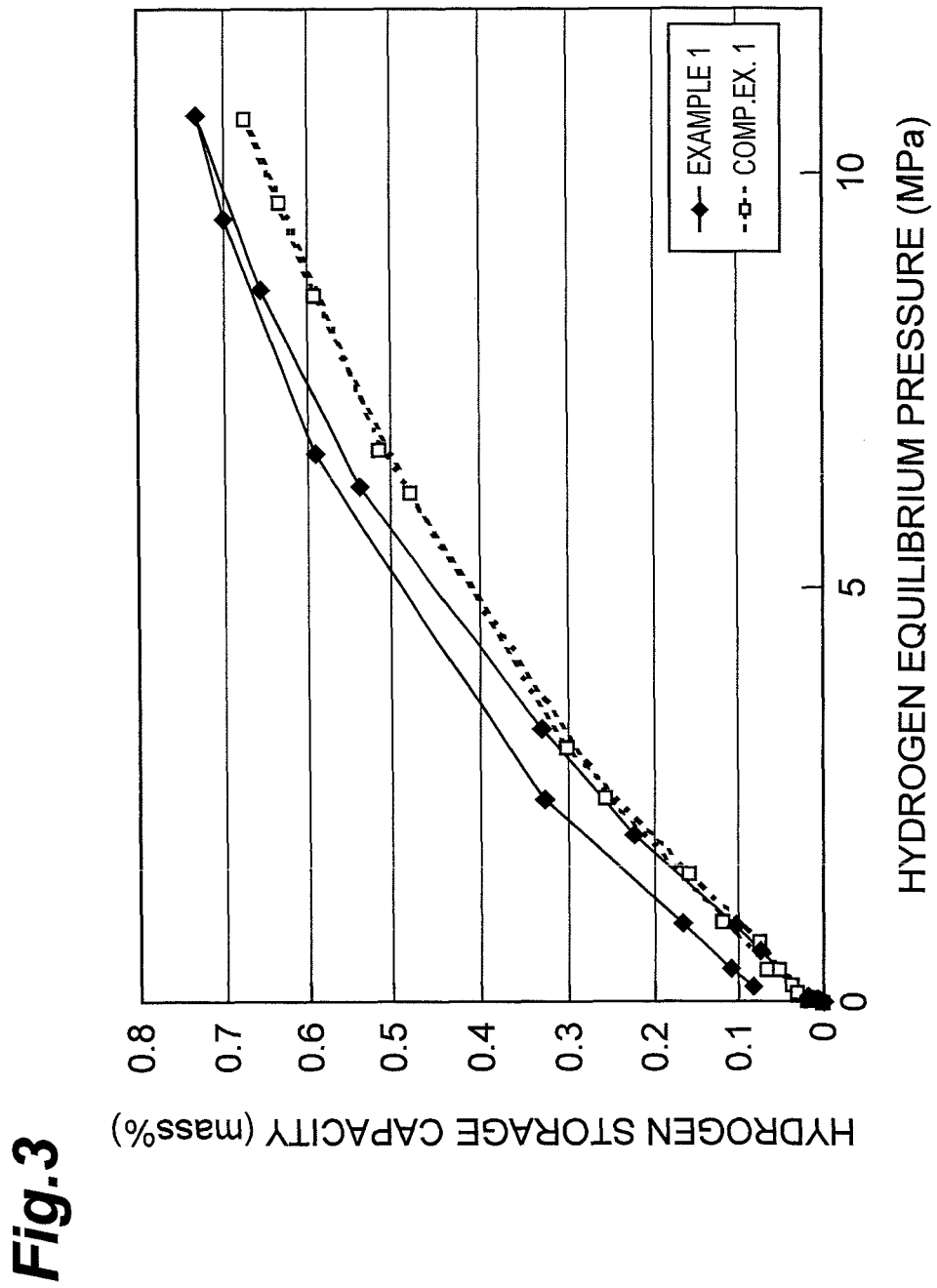
FIG. 3 is a graph showing the relationship between hydrogen storage capacity and equilibrium pressure of hydrogen at 303K, for the hydrogen storage materials of Example 1 of the invention and Comparative Example 1.

The hydrogen storage capacity of the hydrogen storage material of Example 1 was measured with the section of a sample tube containing the hydrogen storage material of Example 1 immersed in a 303K water tank. The hydrogen storage capacity was measured using a hydrogen storage capacity measuring apparatus by Rhesca Corp. The relationship between the hydrogen equilibrium pressure at 303K and the hydrogen storage capacity of Example 1 is shown in FIG. 3. Also, Table 4 shows the hydrogen storage capacity of Example 1 with a temperature of 303K and a hydrogen equilibrium pressure of 10 MPa.

Figure 4:
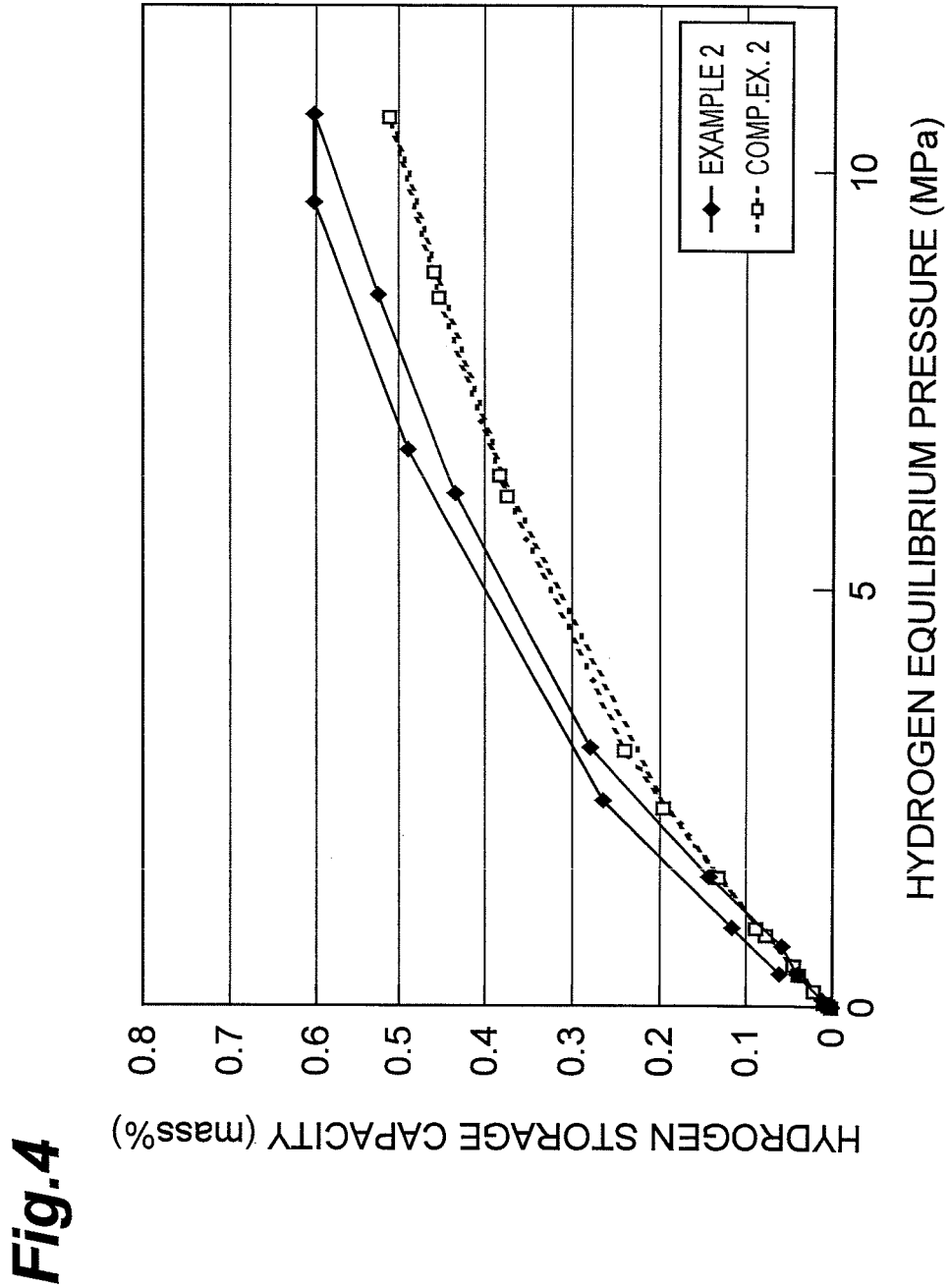
FIG. 4 is a graph showing the relationship between hydrogen storage capacity and equilibrium pressure of hydrogen at 303K, for the hydrogen storage materials of Example 2 of the invention and Comparative Example 2.

The hydrogen storage capacity of each of the hydrogen storage materials of Example 2, Comparative Example 1 and Comparative Example 2 was measured by the same method as in Example 1. The relationship between the hydrogen equilibrium pressure at 303K and the hydrogen storage capacity of Comparative Example 1 is shown in FIG. 3. The relationships between the hydrogen equilibrium pressure at 303K and the hydrogen storage capacities of Example 2 and Comparative Example 2 are shown in FIG. 4. Also, Table 4 shows the hydrogen storage capacity of each of the hydrogen storage materials of Example 2, Comparative Example 1 and Comparative Example 2, with a temperature of 303K and a hydrogen equilibrium pressure of 10 MPa. The hydrogen storage capacities shown in Table 4 are the ratios of the mass of hydrogen stored in each hydrogen storage material with respect to the mass of the hydrogen storage material.

TABLE 4

|  | Hydrogen storage capacity (mass %) |
|---|---|
| Comp. Ex. 1 | 0.647 |
| Example 1 | 0.706 |
| Comp. Ex. 2 | 0.490 |
| Example 2 | 0.575 |

By comparing Example 1 and Comparative Example 1 it was confirmed that hydrogen storage capacity is increased by introducing Li into activated coke. Also, since the hydrogen storage capacity of Example 1 was greater than Comparative Example 1, despite a smaller specific surface area in Example 1 compared to Comparative Example 1, this confirmed that the hydrogen storage capacity of Example 1 depends not only on simple physical adsorption but also on strong interaction between the introduced Li and the hydrogen. The same conclusion is also obtained by comparing Example 2 with Comparative Example 2.

INDUSTRIAL APPLICABILITY

The present invention can be used as a hydrogen storage material with more excellent hydrogen storage capacity than the prior art.

The invention claimed is:

1. A hydrogen storage material comprising:
   a porous carbon material having oxygen-containing functional groups on the surface, and
   Li bonded to the surface of the porous carbon material, wherein
   Li is bonded to oxygen in the oxygen-containing functional groups, and wherein the porous carbon material is activated coke.

2. The hydrogen storage material according to claim 1, wherein the oxygen-containing functional groups are of at least one type selected from the group consisting of a phenolic hydroxyl group, a quinone group, a carboxyl group and a lactonic carboxyl group.

3. A method for producing a hydrogen storage material, comprising:
   heating coke with KOH,
   removing K from the heated coke to obtain activated coke, and
   introducing Li into the activated coke
   so as to obtain the hydrogen storage material of claim 1.

* * * * *